Feb. 17, 1942.     G. M. WRIGHT     2,273,078
MEANS AND METHOD FOR PRODUCING SOUND EFFECTS
Filed March 27, 1939

GILBERT M. WRIGHT
INVENTOR.

BY
ATTORNEY.

Patented Feb. 17, 1942

2,273,078

UNITED STATES PATENT OFFICE 2,273,078

MEANS AND METHOD FOR PRODUCING SOUND EFFECTS

Gilbert M. Wright, Los Angeles, Calif.

Application March 27, 1939, Serial No. 264,399

6 Claims. (Cl. 272—14)

The present invention relates to methods and means for creating novel sound effects which are particularly well adapted for use in motion picture work, radio broadcasting and other forms of entertainment. The method and apparatus of this invention permit a human to modulate a carrier sound so as to form articulate words or phrases therefrom without the use of the normal vocal chords. Since the carrier sound may be vastly different from the normal frequency or pitch of the human voice and may consist of an organization of sound waves characteristic and suggestive of a source other than human, many valuable and novel effects can be produced.

Generally stated, the method of this invention comprises the steps of mechanically applying vibrations of audible frequency to the skin in the region of the throat and then molding the sound waves thus generated within the vocal cavities by means of the tongue and lips, the sound thus emanating in the form of articulate words or phrases but having the pitch, frequency or characteristic of the mechanically applied vibration. Sounds produced in this manner can be used in broadcasting, recording, motion picture work, stage and other entertainment purposes, the production of accompaniments for animated cartoon photoplays and many other purposes.

The present invention also contemplates a simple form of device whereby the methods of the invention can be carried out most effectively.

An object of the invention, therefore, is to provide novel methods of creating sound effects.

A still further object is to provide a method whereby a human may be caused to utter articulate sounds by the use of any desired audible vibrations suggestive in characteristics of a source other than human.

Another object is to provide means and methods whereby a variable modulated organization of audible vibrations can be caused to form articulate sounds.

An object also is to provide and disclose means whereby a human may be caused to articulate by the use of exteriorly imposed vibrations within the audible range.

Other objects, uses, advantages and adaptations of the invention will become apparent to those skilled in the art from the following description. For purposes of facilitating understanding, reference will be had to the appended drawing, in which.

Figure 1:
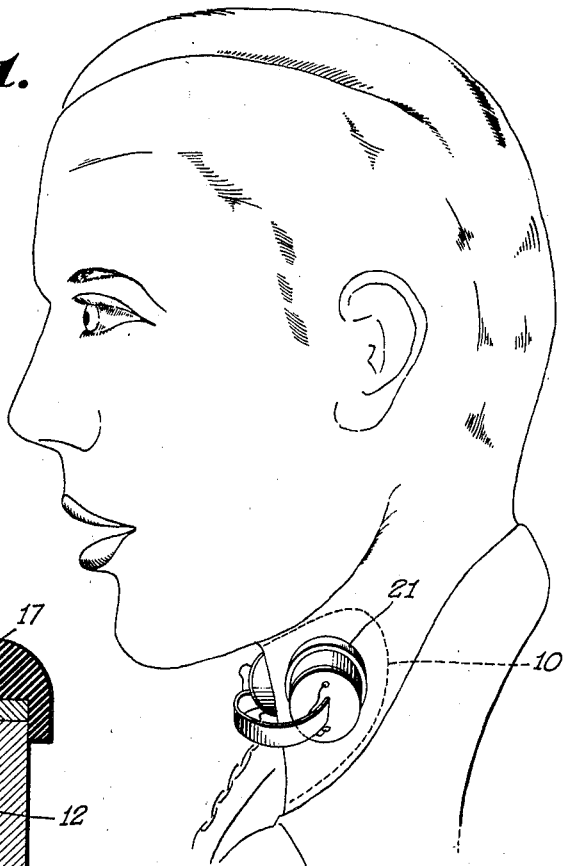
Fig. 1 is a side view of a human head showing the arrangement of elements whereby such human may perform the method of this invention.

As shown in Fig. 1, one or more electro-acoustic transducers of any desired type capable of producing mechanical vibrations within an audible range of frequencies are applied to the skin, preferably in the region of the throat, this region being approximately indicated as the area bounded by the dotted line 10. When two electro-acoustic transducers are employed, one of them may be particularly reactive to low frequencies whereas the other is more reactive to high frequencies, these two instrumentalities being connected in series or parallel to a suitable sound current. The sound current may be supplied to the transducers from any suitable source such as, for example, a microphone located near a suitable source of sound, a record, an oscillator, or the like.

The vibrations thus applied to the skin create sound waves within the vocal cavities of the human head and the sound waves thus formed within the vocal cavities may then be molded into articulate speech by action of the lips and tongue so as to cause sounds having linguistic meaning to be emitted. It is to be understood that although the region of the throat is the preferable zone in which the transducers are applied, such transducers may also be applied to the skin of the cheek or to the area immediately beneath the ears although, as stated hereinbefore, the throat, including the under part of the chin and that part of the neck anterior to the muscles extending upwardly from the shoulders to the head and above the bony structure of the chest, is the preferred zone of application.

Figure 2:
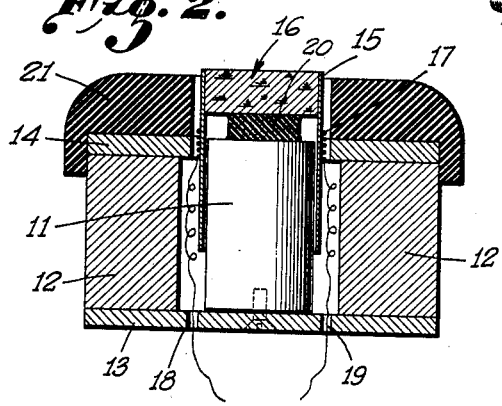
Fig. 2 is an axial section taken through one of the elements shown in Fig. 1.

A form of transducer is shown in Fig. 2 and comprises a permanent magnet having a soft iron core 11, an annular outer steel member 12, a steel base 13 and a ring-like pole piece 14. The central core 11 is provided with a very light weight slidably fitted cylinder armature 15 carrying a contact member 16 which is preferably made of cork or other light weight material. The cylindrical armature 15 carries a sound current coil, generally indicated at 17, the terminals of such sound current coil extending through suitable insulated apertures 18 and 19 in the base plate 13. A small piece of yieldable material, such as sponge rubber 20, is preferably positioned between the cork head 16 and the top of the core 11.

Obviously, sound current passing through the movable coil 17 reacts with the magnetic field, causing the armature member 16 to vibrate. An annular fitting 21 made of rubber or other suitable composition may be fitted over the ends of the device so as to permit the upper surface of the movable cork contact piece 16 to rest against the skin with a light yielding pressure exerted by the elastic means 20. In actual practice, the movable contact piece 16 may vary in size from about ⅜ inch in diameter to 1 inch in diameter, it being understood that these dimensions are being given for purposes of illustration only and not as limiting factors.

Figure 3:
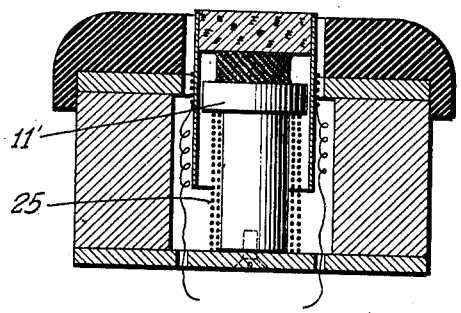
Fig. 3 is an axial section taken through a modified form of device adapted for use in carrying out this invention.

In the form of device shown in Fig. 3 an electromagnetic device is shown, direct current being supplied to a coil 25 surrounding the center post 11'. Field coils may be used instead of the coil around the center post 11'.

Figure 4:
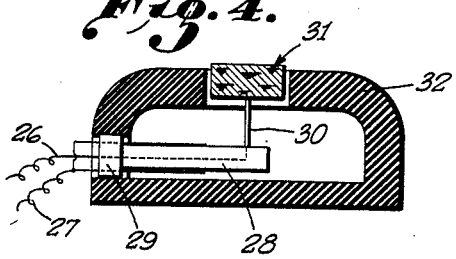
Fig. 4 is a section taken through a still further form of device.

An electrostatic form of device is shown in Fig. 4. The sound current is supplied by the leads 26 and 27. A crystal of quartz, Rochelle salt, or the like is indicated at 28. One of the leads, such as the lead 26, is inserted through the crystal 28. The other terminal 27 is split and applied to the opposing surfaces of the crystal 28. The crystal 28 is firmly held at one end as by the fitting 29. The other end carries a post 30 provided with a contact member 31 adapted to rest against the skin and transmit vibrations thereto.

The housing 32 may be made of any suitable material and may be provided with contours complementary to the contours of the throat to which the device is to be applied.

It will be understood by those skilled in the art that by varying the inertia of the movable element, the reactivity of the devices to high and low frequencies can be changed. When the sound currents are applied to two of the transducers in series or parallel, one of them may be designed to be responsive to low frequencies whereas the other is more responsive to high frequencies. Amazing fidelity of reproduction can be thus obtained.

The device and method of this invention permit startling effects to be readily obtained. In animated cartoon photoplays, normally inanimate and inarticulate objects, such as ducks, dogs, whistles, saws and the like, may be caused to speak. For example, the sound produced by a circular saw cutting a piece of lumber may be recorded. This recorded sound is then supplied to transducers positioned as described hereinabove and the wearer thereof can now articulate (without using his own vocal cords), so as to produce words, phrases and the like which are understandable but which still are formed from that organization of sounds which emanated from the saw and lumber.

It will be appreciated that instead of a saw, the characteristic, distinctive, suggestive or descriptive sound used as the carrier may comprise any variable, modulated organization of audible vibrations such as, for example, a symphony orchestra, an individual musical instrument playing a melody which is recognizable as such during articulation of linguistic sound, wind of high velocity, a waterfall, etc.

The sound current supplied to the transducers need not come from a recording but, as stated hereinbefore, may be supplied from a microphone and amplifier, the microphone being positioned in the effective receiving zone of the source.

Oscillators adapted to produce any given or desired frequency may also be employed as the source. The use of oscillators as the source of sound current is particularly well adapted for use by those individuals who have lost the ability to articulate or speak by reason of the destruction of the vocal cords. An oscillator capable of supplying frequencies similar to those of the normal speaking voice can supply voice current to the transducers, which being in contact only with the skin of the wearer and in the region of the throat, can be worn without creating any undesirable attention and which would permit the wearer to speak without the necessity of holding a tube in the mouth, as is the case with the artificial larynxes now known. Furthermore, by inducing the sound through the skin of the throat so that it arises in the region in which natural sounds are created by the vocal chords, a great improvement in the ease and clarity of articulation is obtained.

All changes and modifications coming within the scope of the appended claims are embraced thereby.

I claim:

1. A method of converting inarticulate sounds characteristic of a source other than human into understandable articulations, which comprises: mechanically applying vibrations of a sound characteristic of a source other than human to the skin of a human in the region of the throat, transmitting such vibrations through the skin to cause the air within the vocal cavities to vibrate, and then molding the sound waves thus generated within the vocal cavities into articulate form by means of the tongue and lips.

2. A method of translating sound from an external source other than that produced by the unaided human voice, which comprises: mechanically applying vibrations of audible frequency to the skin of a human in the region of the throat, transmitting such vibrations through the skin to cause the air within the vocal cavities to vibrate, and then molding the sound waves thus generated within the vocal cavities into articulate form by means of the tongue and lips.

3. A method of the character described, comprising: mechanically applying vibrations of audible frequencies to the skin of a human in the region of the throat, transmitting such vibrations through the skin to cause the air within the vocal cavities to vibrate, and then molding the sound waves thus generated within the vocal cavities to impart to them the understandability of speech, by means of the tongue and lips and without the use of the vocal chords of the human to which such vibrations are applied.

4. A method of modulating sounds of non-human character to impart to them the understandability of speech, which comprises: applying vibrations of a sound of audible frequency, such sound being characteristic of a source other than human, to the skin of a human in the region of the throat, transmitting such vibrations through the skin to cause the air within the vocal cavities to vibrate, and then molding the sound waves thus generated within the vocal cavities into articulate speech by means of the tongue and lips.

5. The method of superposing a voice effect on audio frequency waves having magnitudes of amplitude and frequency variations of the order of those occurring in speech and music, that comprises generating currents corresponding to such sound waves, translating them into mechanical energy, imparting the energy to a voice part of the human head, and modifying said energy by operation of voice parts, the step of imparting the energy to the voice part comprising imparting the energy to the neck at the larynx.

6. The method of creating a voice effect on audio frequency waves having magnitudes of amplitude and frequency variations of the order of those occurring in speech and music, that comprises generating currents corresponding to such sound waves, translating them into mechanical energy, imparting the energy to the vocal cavity of the human head, and modifying said energy by operation of the lips and tongue, the step of imparting the energy to the vocal cavity including imparting the energy to the neck at the region of the larynx.

GILBERT M. WRIGHT.